Figure 1:
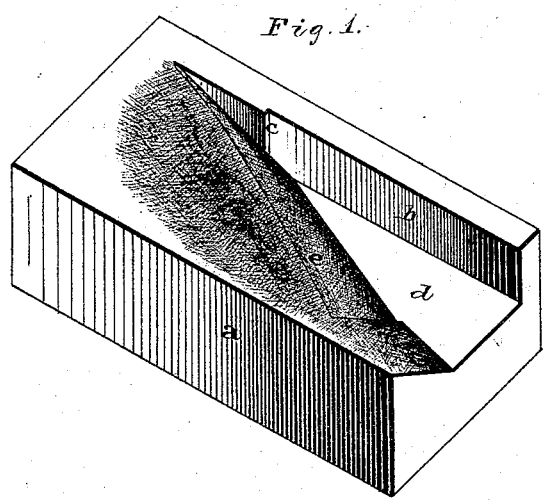
Figure 2:
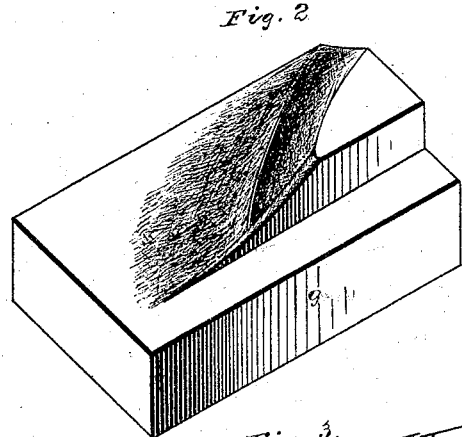
Figure 3:
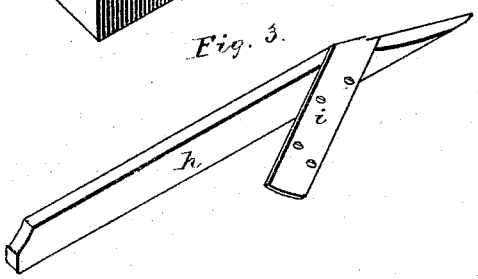

C. H. THOMPSON.
Dies for Welding Plow-Irons.

No. 152,579.            Patented June 30, 1874.

WITNESSES.           INVENTOR.

UNITED STATES PATENT OFFICE.

CHARLES H. THOMPSON, OF MOLINE, ILLINOIS, ASSIGNOR OF ONE-HALF HIS RIGHT TO JNO. VANLURANCE, OF SAME PLACE.

IMPROVEMENT IN DIES FOR WELDING PLOW-IRONS.

Specification forming part of Letters Patent No. 152,579, dated June 30, 1874; application filed April 21, 1874.

*To all whom it may concern:*

Be it known that I, CHARLES H. THOMPSON, of Moline, in the county of Rock Island and State of Illinois, have invented certain new and useful Improvements in the Manufacture of Plows; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in dies for the manufacture of plows; and it consists in the peculiar construction of the dies, in which the land-side and wing-brace are welded together.

The accompanying drawings represent my invention.

$a$ represents the lower part of the die, in which the parts are placed to be welded together. In the top of this block is formed a recess, which has a vertical shoulder, $b$, with a small offset, $c$, on one side, a flat bottom, $d$, and a curved slanting surface, $e$, which extends diagonally backward from the shoulder, as shown. The upper part, $g$, of the die has its under side so formed as to correspond to the shape of the recess in the lower part, $a$, there being a sufficient space left between the two to receive the land-side and brace, which are to be welded together. The land-side $h$ has a rabbet in its outer side at the front end, corresponding to the offset $c$ in the die, in which rabbet the downwardly-projecting wing of the slip-share fits. The wing-brace $i$ consists of a plate of any desired length or width, which projects backward from the front end of land-side at an angle of about thirty degrees, and which has a row of holes along its upper and lower edges, by means of which both the slip-share and mold-board are secured to it. The land-side and this brace, having been heated to a welding-heat, are placed in the die $a$, and then by dropping the upper part $g$ upon them they are not only welded solidly together, but the wing-brace is molded into shape so as to receive the share and mold-board.

Having thus described my invention, I claim—

The dies $a$ $g$, constructed with the vertical shoulder $b$, and diagonal slanting surface $e$, substantially as and for the purpose set forth.

In testimony that I claim the foregoing I have hereunto set my hand this 28th day of March, 1874.

CHARLES H. THOMPSON.

Witnesses:
EUGENE LEWIS,
JOHN VANLURANCE.